United States Patent [19]
Ullmann

[11] Patent Number: 5,485,778
[45] Date of Patent: Jan. 23, 1996

[54] BEVERAGE BREWING APPARATUS

[75] Inventor: Roland Ullmann, Offenbach, Germany

[73] Assignee: Braun Aktiengesellschaft, Kronberg, Germany

[21] Appl. No.: 251,504

[22] Filed: May 31, 1994

[30] Foreign Application Priority Data

Jun. 1, 1993 [DE] Germany .............................. 4318113.9

[51] Int. Cl.⁶ .................................................... A47J 31/24
[52] U.S. Cl. .............................................. 99/295; 99/307
[58] Field of Search ............................ 99/295, 306, 300, 99/304, 305, 307, 310, 311, 312, 313, 314, 315, 316; 426/433

[56] References Cited

U.S. PATENT DOCUMENTS

| | | | |
|---|---|---|---|
| 4,704,954 | 11/1987 | Mollenhoff | 99/295 |
| 4,714,011 | 12/1987 | Ly | 99/295 |
| 4,986,171 | 1/1991 | Precht | 99/295 |
| 4,995,311 | 2/1991 | Naya et al. | 99/295 |
| 5,111,740 | 5/1992 | Klein | 99/304 |
| 5,133,247 | 7/1992 | Pastrick | 99/295 |

FOREIGN PATENT DOCUMENTS

| | | | |
|---|---|---|---|
| 8914876 | 8/1990 | Germany | A47J 31/04 |
| 9112320 | 2/1992 | Germany | A47J 31/00 |
| 2229354 | 9/1990 | United Kingdom | A47J 31/10 |

*Primary Examiner*—Robert W. Jenkins
*Attorney, Agent, or Firm*—Fish & Richardson

[57] ABSTRACT

The invention is directed to a beverage brewing apparatus (1) comprising a filter assembly (18) which is removable from the brewer housing (2) along a plane of movement (24) and includes an opening (25) open in upward direction and formed by an upper rim (22). In inserted condition, the opening (25) of the filter assembly (18) rests under a cover (28) from which the brewing water flows into the filter assembly (18). The predominant portion of the upper rim (22) of the filter assembly (18) lies in a first plane (23). The area (26) of the cover (28) cooperating with the predominant portion of the upper rim (22) lies in a second plane (30). With the filter assembly (18) in inserted condition, the first (23) and the second (30) plane extend essentially parallel to each other and are vertically disposed in close proximity to each other. According to the invention, both the first (23) and the second (30) plane are inclined relative to the plane of movement (24) by an angle of inclination (a). For one thing, this arrangement is intended to ensure that, with the filter assembly (18) inserted in the housing (2), the upper rim (22) of the filter assembly (18) is at all times maintained in sealing engagement with the cover (28) closing the opening (25) of the filter assembly (18) from above, and for another thing, it is intended to prevent rubbing of the upper rim (22) of the filter assembly (18) against the cooperating area (26) of the cover (28) as the filter assembly (18) is removed from the housing (2).

9 Claims, 6 Drawing Sheets

BEVERAGE BREWING APPARATUS

This invention relates to a beverage brewing apparatus with a filter assembly which is removable from the brewer housing along a plane of movement and includes an opening open in upward direction and formed by an upper rim, wherein the filter assembly is adapted to receive ingredients such as ground coffee beans or tea leaves for preparing the brew, wherein the opening of the filter assembly rests in inserted condition under a cover providing a discharge port from which the brewing water is allowed to flow through the opening into the filter assembly and, while extracting its contents, onwards as a brew into a vessel placed thereunder, wherein the predominant portion of the upper rim of the filter assembly lies in a first plane, wherein further the area of the cover cooperating with the predominant portion of the upper rim lies in a second plane, and wherein, with the filter assembly in inserted condition, the first and the second plane extend essentially parallel to each other and are vertically disposed in close proximity to each other.

A beverage brewer of this type was sold commercially by the applicant under the designation Braun Traditional 2, KF 35 type, as illustrated in the Product Overview of February 1983 on page 28. In this beverage brewer, the filter assembly is inserted into a horizontally extending coulisse guideway provided on the housing and representing the plane of movement of the filter assembly. In this arrangement, the plane of movement, the upper rim of the filter assembly, that is, the first plane, and the area of the cover cooperating with the upper rim of the filter assembly, that is, the second plane, extend parallel to each other, which means that if the filter assembly is inserted into the housing along its plane of movement without the upper rim of the filter assembly striking against the cooperating area of the cover or rubbing against it continuously, a noticeable distance is necessary between these two planes.

In this known beverage brewer, the manufacturing tolerances inevitably occurring in the manufacture of the individual parts of the beverage brewer may ultimately cause the relative distance of the first and the second plane to be often too large after the parts are assembled together, so that during the brewing operation an excessive amount of heat and aromatic substances escape through this gap, preventing the brewing cycle from being performed under optimum conditions. As a result, the coffee grounds are not optimally extracted on the one hand, while on the other hand a brew is produced which is often too cold already and less flavorful. By contrast, if the tolerances are too close, the risk exists that the upper rim of the filter assembly constantly rubs or catches against the cover as it is inserted.

Further, applicant has been marketing for many years beverage brewers under the designation Braun Aromaster 10 or 12, types KF 42 to KF 92, as illustrated and described in the "Herbst 1989 Programmübersicht" (Fall 1989 Product Overview) on pages 40 to 43. In these beverage brewers, the filter assembly is moved along the plane of movement by pivoting about a pivot axis disposed in the housing and extending normal to that plane. In this arrangement, the plane of movement as well as the first and second plane extend equally parallel to each other, resulting necessarily in the same disadvantage as described in the foregoing.

It is therefore an object of the present invention to provide a beverage brewing apparatus in which, with the filter assembly inserted in the housing, the upper rim of the filter assembly is at all times in sealing engagement with the cover closing the opening of the filter assembly from above, the cover representing the brewing unit proper in which the discharge port for the brewing water is disposed. It is a further object to prevent a rubbing motion of the upper rim of the filter assembly against the cooperating area of the cover as the filter assembly is removed from the housing.

According to the present invention, this requirement is satisfied by the features of patent claim 1. Because both the first and the second plane are inclined relative to the plane of movement of the filter assembly, as the filter assembly is swung open, its upper rim will move progressively away from the cooperating area of the cover, that is, the second plane, enabling the filter assembly to be withdrawn freely without constantly jamming on the cover. Conversely, as the filter assembly is inserted, its upper rim will approach the cooperating area of the cover until it is in sealing engagement with the underside of the cover. It is precisely in this position that the filter assembly is closed from above, preventing the escape of heat and aroma to the largest possible extent. As the filter assembly is approached towards the housing, short of being in fully inserted condition, the plane of movement and the upper rim of the filter assembly provide the function of a gap which continues to be moved into the free space between the plane of movement and the area of the cover cooperating with the upper rim of the filter assembly, until the filter assembly closes this open gap completely and the surfaces of the upper rim of the filter assembly and the underside of the cover forming the first and, respectively, the second plane are in sealing engagement with each other.

A further advantage accomplished with the present invention is that, on withdrawal of the filter assembly, the housing portions of the brewing unit protruding from the underside of the cover can be virtually overtraveled by the areas of the filter assembly cooperating with the upper rim of the filter assembly, until the filter assembly is fully swung open away from the housing. Because during the brewing cycle according to the invention, there is hardly any steam allowed to escape from the filter assembly, the available amount of water is practically fully utilized for the brew.

Where the filter assembly is inserted into the housing from the front along the plane of movement, the first and the second plane, while yet being inclined relative to the plane of movement, invariably extend parallel to each other, with the relative distance of the two planes decreasing progressively during insertion until they rest against each other in a sealed relationship.

With the filter assembly in inserted condition, a further feature of the present invention as disclosed in claim 2 results likewise in a parallel position of the first and the second plane, which, however, is not reached until after the filter assembly is fully inserted in the housing, that is, when the upper rim engages the underside of the cover. With the filter assembly swung open, the second plane extends transversely to the first plane. This pivot axis results in greater ease of handling of the filter assembly, allowing it to remain hinged on the housing also after being swung open. In this position, a conical paper filter or an ingredient may be loaded into the filter assembly or removed therefrom following use.

Another aspect of the present invention as disclosed in claim 6 has the advantage that in cases where the area of the cover cooperating with the upper rim of the filter assembly includes portions protruding significantly from the second plane of the underside of the cover towards the filter assembly, the cover can be overtraveled by the remaining portion of the upper rim extending below the first plane, when this can no longer be accomplished by the upper rim of the filter assembly. In general, this applies only to that area of the filter assembly that is not visible from the outside when the filter assembly is in the shut position, that is, that portion that is closest to the housing.

In an arrangement according to claim 3, the maximum fill level of the filter assembly is not limited excessively, while yet the width of the gap between the first and the second plane changes sufficiently readily when the filter assembly is swung open. Good results are obtained at an angle of inclination as small as 4 degrees.

The further feature of the present invention according to claim 7 ensures that, in operation of the beverage brewing apparatus, the inserted filter assembly is always closed in sealing engagement with the housing.

Another aspect of the present invention as disclosed in claim 4 results in the advantage that, after the upper rim of the filter assembly rests sealingly against the underside of the cover, that is, against the underside of the brewing unit, a locking or snap-on device additionally provided on the housing engages the filter assembly, causing the filter assembly to be constantly urged against the housing under resilient action, the first and the second plane being thus invariably biased into sealing contact with each other.

According to claim 8, the tightness of the seal can be further improved by an elastically deformable sealing ring establishing contact between the upper rim of the filter assembly and the cooperating area of the underside of the cover.

Two embodiments of the present invention will now be described in more detail in the following with reference to the accompanying drawings. In the drawings.

Figure 1:
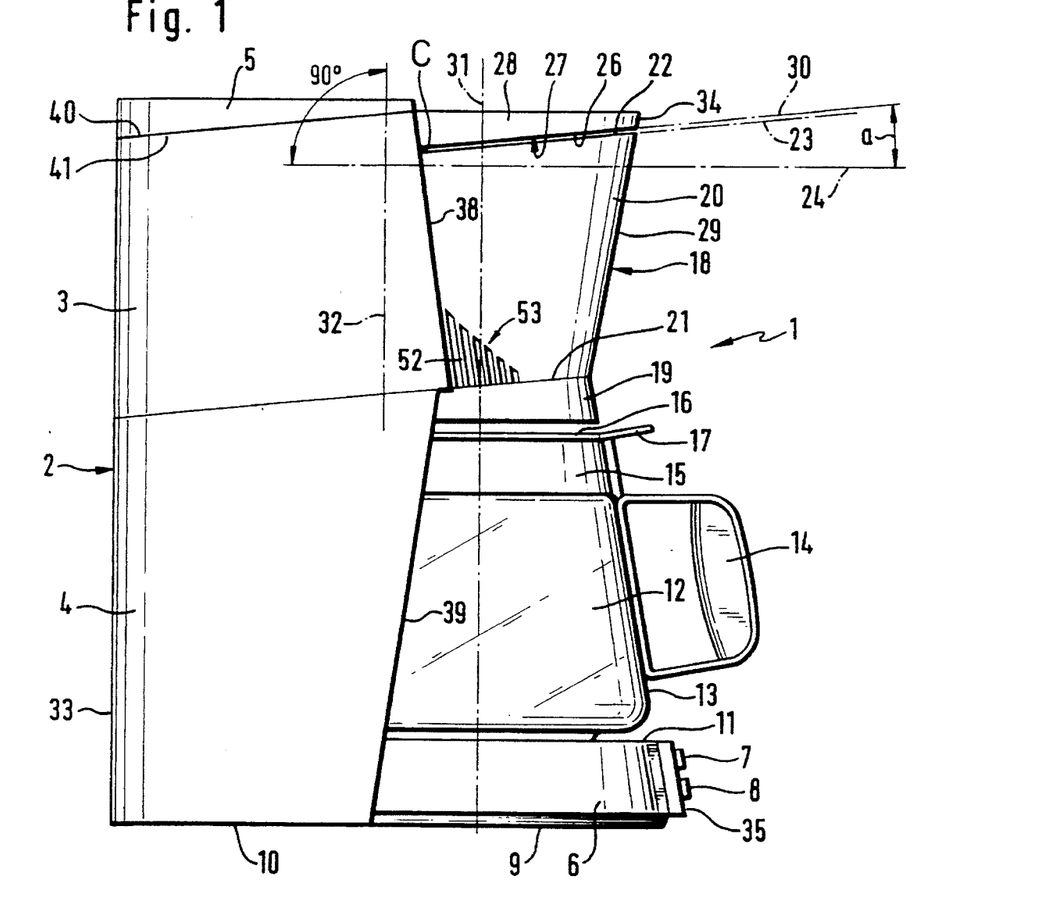
FIG. 1 is a side elevation as viewed from the left illustrating a first embodiment of a beverage brewing apparatus showing the filter assembly swung shut within the housing, with the filter assembly being pivotal about a pivot axis.

In FIGS. 1 to 10, the beverage brewing apparatus 1 is comprised of a columnar housing 2 of an essentially semicylindrical cross-section whose upper part provides the water reservoir 3 while the lower part provides the supporting structure 4 accommodating the cold-water piping to the flow-through heater (not shown), the hot-water piping 71 (FIGS. 8 and 9) from the flow-through heater, as well as parts of the electronic equipment (not shown). The water reservoir 3 is closed at its top by a lid 5 adapted to swing open in upward direction. Adjoining the supporting structure 4 to the right when viewing FIG. 1 is an upwardly tapering frusto-conical base 6 receiving the electric flow-through heater controllable by electric switches 7, 8 provided on the front of the base 6. The bottom 9 of the base 6 extends on a horizontal plane common with the bottom 10 of the supporting structure 4, thus providing the support surface of the beverage brewing apparatus 1.

On the upper side 11 of the base 6, a warming plate (not shown) is inserted on which a vessel 12 sits as shown in FIGS. 1, 3 to 7, and 10. The warming plate is in thermal contact with the flow-through heater provided in the base 6. A handle 14 is attached to the outside 13 of the vessel 12. Fitted to the edge of the opening of the vessel 12 is a plastic ring 15 provided with a pouring spout (not shown) at the end remote from the handle 14. The opening of the plastic ring 15 is closed by a lid 16 detachable from the plastic ring 15 by means of a handhold 17. The vessel 12 is of an upwardly tapering frusto-conical shape.

In FIGS. 1, 3, 5 to 8 and 10, adjacent to the lid 16 in vertically upward direction is an integrally formed filter assembly 18 substantially comprised of two housing portions 19 and 20. While the lower housing portion 19 is essentially conformed to the contour of the vessel 12, equally tapering upwardly in a frusto-conical fashion, the adjoining housing portion 20 is fashioned so as to widen upwardly. The height of the housing portion 19 amounts to about one sixth of the height of the housing portion 20, the transition between the housing portions 19, 20 being indicated by the parting line 21.

Figure 8:
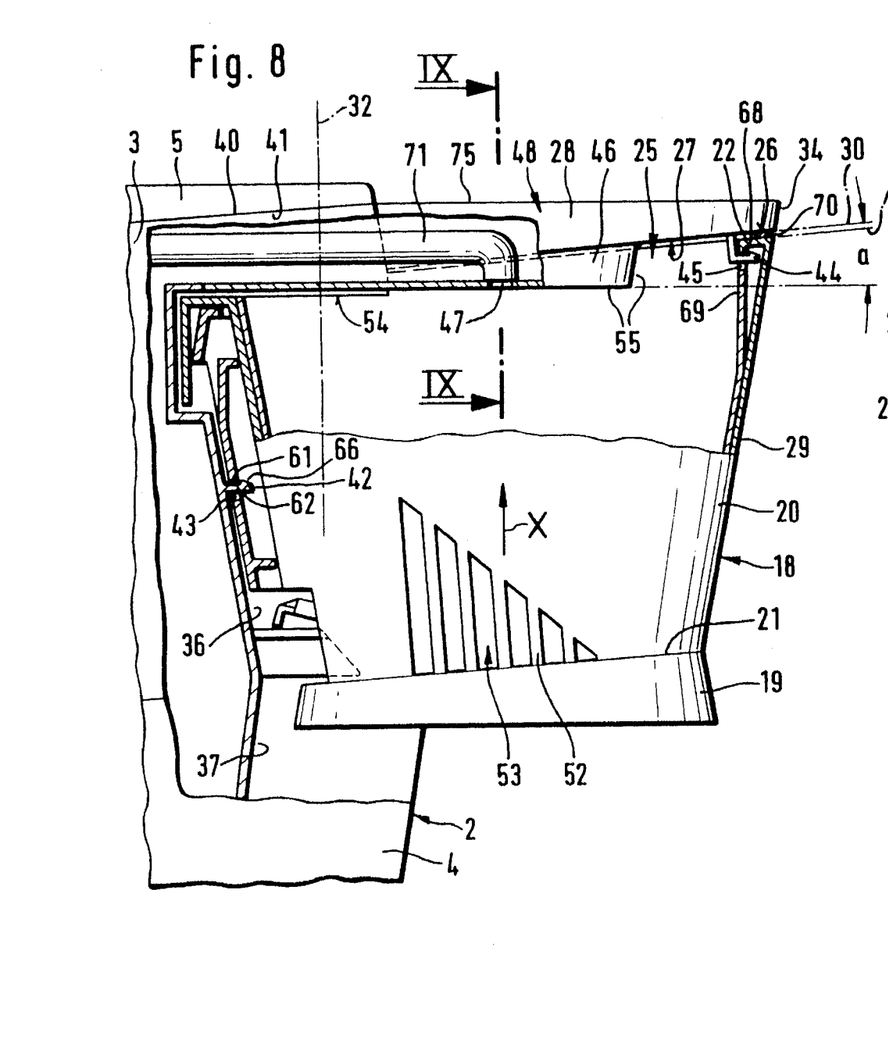
FIG. 8 is a partial longitudinal sectional view of the beverage brewing apparatus in the area of the filter assembly, taken as indicated by the broken line VIII—VIII of FIG. 2.
Figure 9:
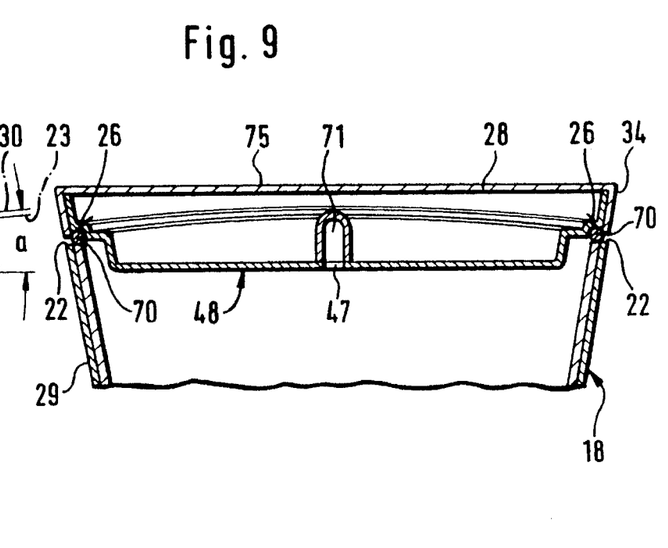
FIG. 9 is a partial longitudinal sectional view of the filter assembly and the cover, taken as indicated by the broken line IX—IX of FIG. 8.
Figure 10:
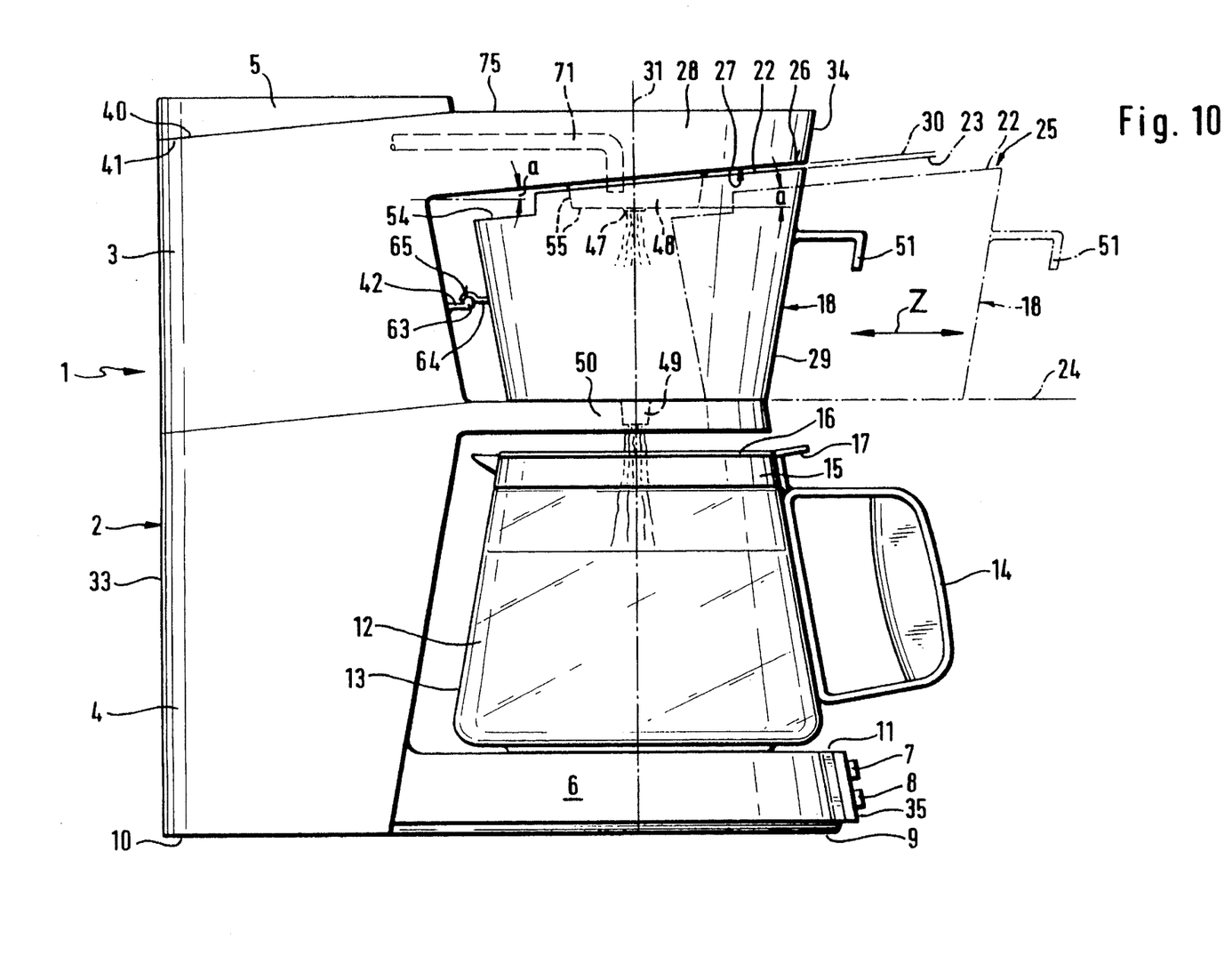
FIG. 10 is a longitudinal sectional view of a second embodiment of a beverage brewing apparatus in which the filter assembly is horizontally removable from the housing from the front by sliding along a guideway.

In FIGS. 1, 9 and 10, the upper rim 22 of the filter assembly 18 extends in a first plane 23 normal to the plane of the drawing and forming an angle a with the plane of movement 24 of the filter assembly 18. The upper rim 22 extends at least in that area of the first plane 23 in which it is visible from the outside around the filter assembly 18, that is, in the area bounded by points A and B of FIG. 2. The same applies to the annular area 26 on the underside 27 of the cover 28 which closes the opening 25 of the filter assembly 18 from above, so that, with the filter assembly 18 swung shut in the beverage brewer 1 as illustrated in FIGS. 1, 2, 5, and 8 to 10, the circumferential surface 29 of the filter assembly 18 combines with the circumferential surface 34 of the cover 28 to merge almost smoothly into a conical surface.

Figure 5:
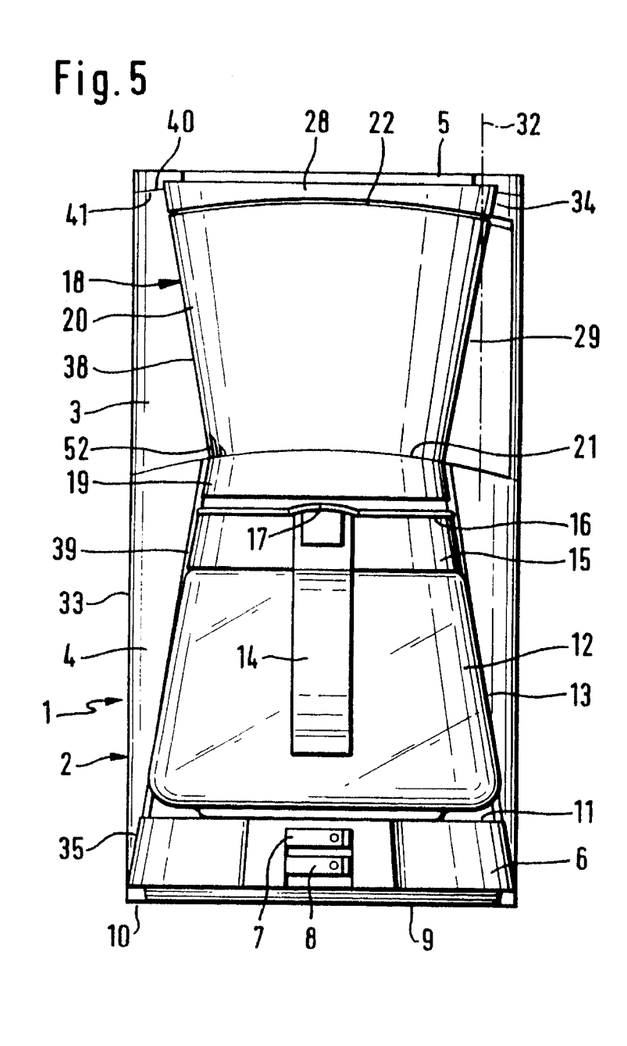
FIG. 5 is a front elevation of the beverage brewing apparatus of FIG. 1.

The underside 27 of the cover 28 forms at least in the annular area 26 a second plane 30 extending parallel to the first plane 23 when the filter assembly 18 is inserted into the housing 2, thus assuming its brewing position, as illustrated in FIGS. 1, 5 and 10. For clarity of illustration, FIGS. 1, 5 and 10 show the upper rim 22 at a small relative distance to the annular area 26, whilst in practice only a thin dark line will be seen on the appliance, because the upper rim 22 rests in sealing engagement and thus nearly without any clearance against the annular area 26, leaving manufacturing tolerances out of consideration.

The plane of movement 24 of the filter assembly 18 extends parallel to the bottoms 9, 10 and normal to the common longitudinal axis 31 resulting for the filter assembly 18, the vessel 12 and the base 6 after the filter assembly 18 has occupied the shut position illustrated in FIGS. 1, 2, 5, and 8 to 10. According to FIGS. 1 to 9, the filter assembly 18 is adapted to swing out of the housing 2 about a pivot axis 32 provided on the outer edge of the housing 2, this movement occurring anticlockwise in the direction of arrow Y of FIG. 2, with the pivot axis 32 extending normal to the plane of movement 24, as clearly shown in FIG. 1. In this arrangement, the pivot axis 32 is formed by vertically disposed bores 57, 58 (FIG. 7) provided in the housing 2, which bores are engaged by rotary pins 59, 60 of a swinging arm 72 (broken lines) to which the filter assembly 18 is hingedly connected, the filter assembly being also adapted to be unhinged from the swinging arm 72 for cleaning purposes by giving it an upward motion.

Figure 2:
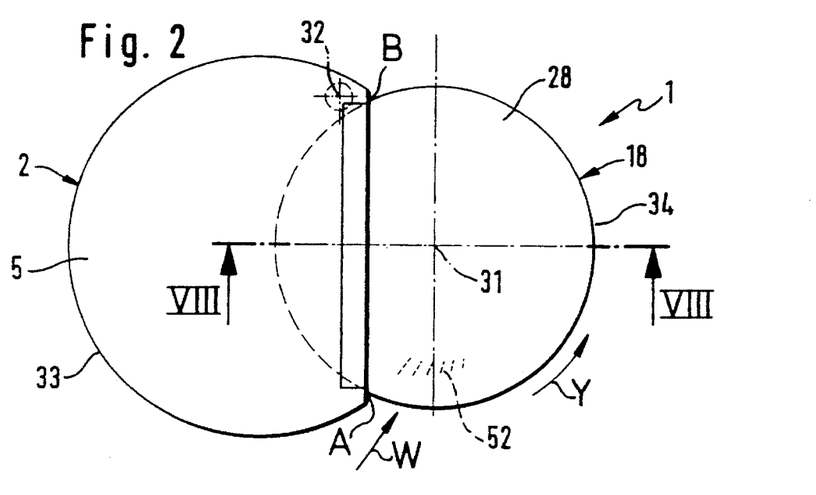
FIG. 2 is a top plan view of the beverage brewing apparatus of FIG. 1.
Figure 3:
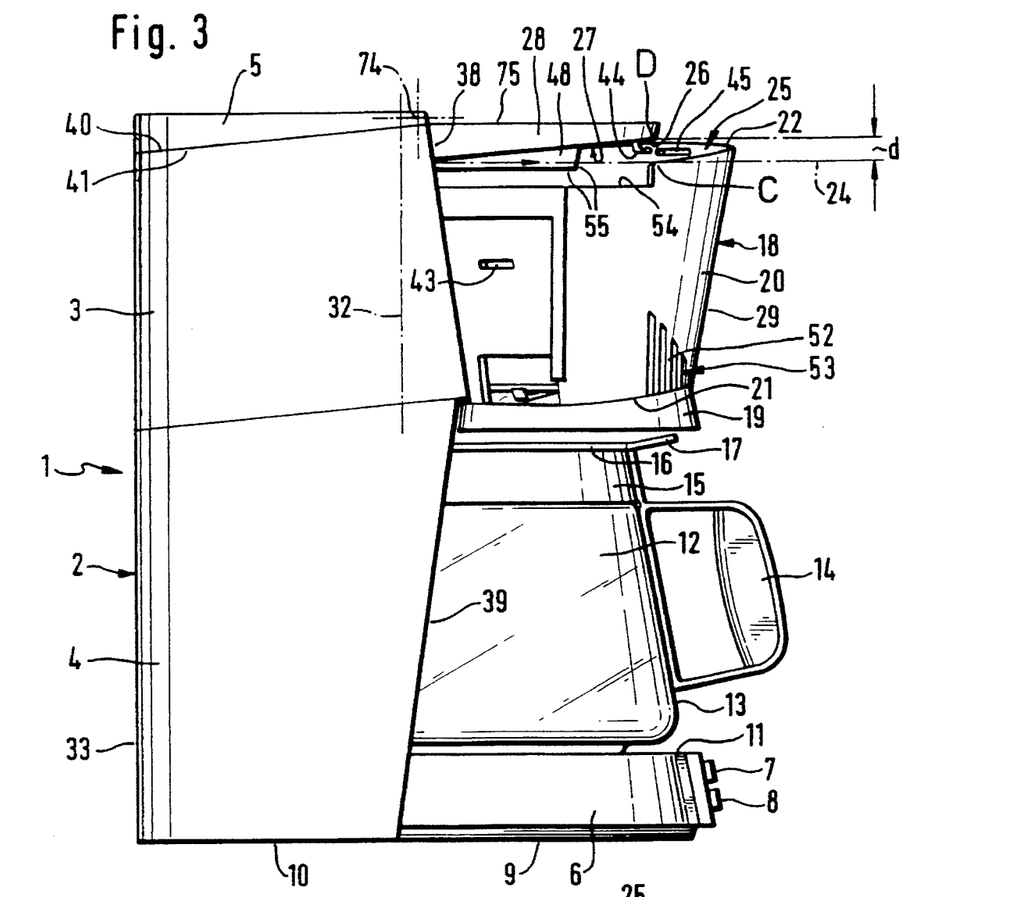
FIG. 3 is a side elevation of the beverage brewing apparatus of FIG. 1, showing the filter assembly partially swung open out of the housing.
Figure 6:
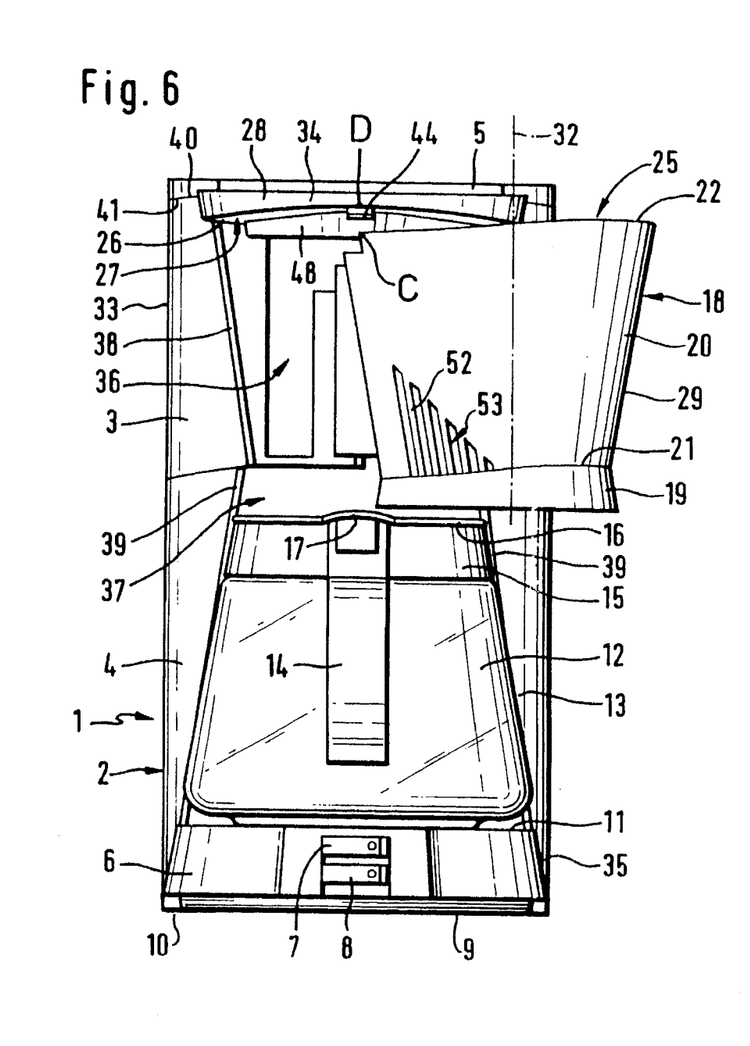
FIG. 6 is a front elevation of the beverage brewing apparatus of FIG. 3.
Figure 7:
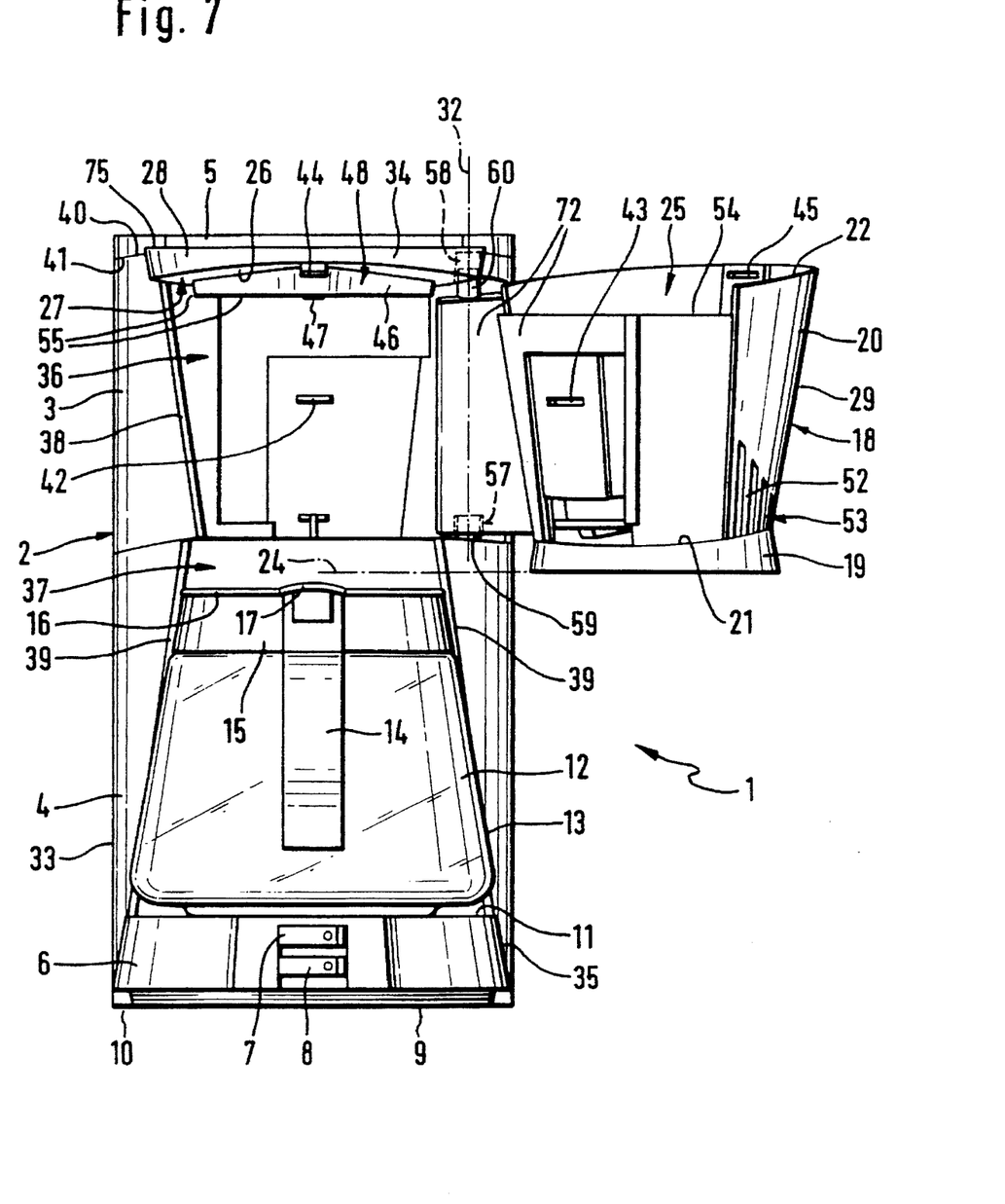
FIG. 7 is a front elevation of the beverage brewing apparatus of FIG. 3, showing the filter assembly fully swung open out of the housing.

Because the circumferential surfaces 34, 29, 13 and 35 of the cover 28, the filter assembly 18, the vessel 12 and the base 6, respectively, form conical structures partially engaging the housing 2 as shown in FIG. 2, correspondingly conformed cavities 36, 37 of essentially semi-conical shape are provided on the housing 2 as shown in the front elevations of FIGS. 6 and 7, the cavities forming inclined edges 38, 39 in the area of transition to the circumferential surface 33 of the housing 2. The cavities 36, 37 thus serve to receive respective parts of the cover 28, the filter assembly 18, the vessel 12, and the base 6.

As becomes further apparent from FIG. 1, also the upper rim 40 of the water reservoir 3 and the lower edge 41 of the lid 5 extend parallel to each other, forming equally an angle a with the horizontally extending plane of movement 24 parallel to which there is, of course, the water level in the reservoir 3 when filled with water. Owing to the inclination of the upper rim 40 of the water reservoir 3, an operator receives a clearer indication of a filled condition of the water reservoir 3, because the water level distinguishes itself more clearly from the inclined rim 40. As appears from FIGS. 3 and 4, the pivot axis 73 of the lid 5 is provided in the transition area from the water reservoir 3 to the cover 28, lying at such an elevation identified by the pivot point 74 that the lid 5 is adapted to swing open in clockwise direction until it comes to rest on the upper side 75 of the cover 28. This allows easy filling of water from the front without interference from the lid 5.

As becomes apparent from FIG. 7, the rear area of the cavity 36 provides a locking device 42 in the form of a tongue which, with the filter assembly 18 completely inserted in the housing 2 as shown in FIG. 1, includes a notch 61 for resilient locking engagement with the edge 62 of a slot 43 provided on the filter assembly (FIG. 8), causing the filter assembly 18 to maintain its shut position illustrated in FIG. 1. According to FIG. 8, the locking device 42 has on its upper side at its free end a ramp 66 serving to ensure that the upper edge 62 of the slot 43 first abuts the ramp and, with the movement of the filter assembly 18 in the shut position S continuing (FIG. 4), produces a slight lifting motion of the filter assembly in the direction X (FIG. 8), whereby the upper rim 22 of the filter assembly 18 is biased into engagement with the annular area 26 on the underside 27 of the cover 28, thereby sealing the opening 25 of the filter assembly 18 relative to the outside. Here, too, the same effect of pressure as previously described is accomplished.

According to FIG. 10, the locking device 42 is comprised of a tongue having an elevation 63 resiliently engaging within a depression 65 provided on another tongue 64 which is part of the filter assembly 18.

According to FIGS. 7 and 8, a second locking device 44 is provided in the front area of the cover 28, including a second depression 68 resiliently engaging within a correspondingly formed wall 69 of a second slot 45 provided on the front side of the filter assembly 18, as already described in the foregoing. The two locking devices 42, 44 resiliently engaging their associated slots 43, 45 operate to ensure a particularly uniform abutting engagement of the upper rim 22 of the filter assembly 18 with the underside 27 of the cover 28 along the entire periphery.

As becomes further apparent from FIGS. 7 and 8, the underside 27 of the cover 28 has in its mid-area an essentially circular-disk-shaped elevation 46 projecting downwardly towards the filter assembly 18 and provided with a central discharge port 47. The elevation 46 combines with the cover 28 to form the brewing unit 48 proper of the beverage brewing apparatus 1, hot water being pumped into it from the flow-through heater (not shown) through the hot-water piping 71, collecting there and flowing from the central discharge port 47 through the opening 25 into the filter assembly 18 where it mixes with the coffee grinds or tea leaves held therein, extracting them and flowing as a brew through an outlet 49 provided on the underside of the filter assembly 18 into the vessel 12 placed underneath, as indicated in FIG. 10.

The beverage brewing apparatus 1 of FIG. 10 differs from the beverage brewing apparatus 1 of FIGS. 1 to 9 only in that the filter assembly 18, rather than swinging about a pivot axis, is guided in a horizontally extending sliding guide 50, and that the filter assembly 18 is inserted into the housing 2 from the front by a horizontal movement as indicated by arrow Z.

Figure 4:
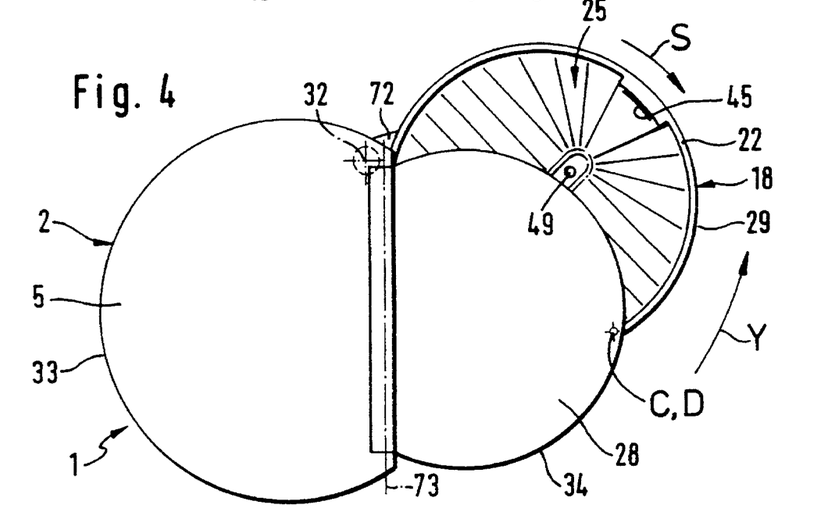
FIG. 4 is a top plan view of the beverage brewing apparatus of FIG. 3.

To remove the filter assembly 18 from the housing, the embodiment of FIG. 10 provides a carrying handle 51 on its front, whilst in the embodiment of FIGS. 1 to 9 a gripping area 53 is provided on the circumferential surface 29 of the filter assembly 18, the gripping area featuring vertically extending ribs 52 and opening the filter assembly 18 when a transverse force is applied thereon by hand in the direction W of FIG. 2, as shown in FIG. 4.

According to FIGS. 3, 6, 7 and 10, the upper side of the filter assembly 18 has in the area engaging the cavity 36 a remaining portion 54 which is recessed relative to the upper rim 22 and is required to prevent this portion from hitting against the elevation 46, that is, against the outer surface 55 of the brewing unit 48 when the filter assembly 18 swings out of the cavity 36 of the housing 2. However, the recessed area on the remaining portion 54 should be as small as possible.

FIGS. 8 and 9 provide the addition of an annular seal 70 in the annular area 26 to effect an even tighter seal of the upper rim 22 of the filter assembly 18 relative to the cover 28.

The mode of operation of the beverage brewing apparatus shown is as follows:

After the filter assembly 18 has assumed the shut position illustrated in FIGS. 1, 2, 5, and 8 to 10, the upper rim 22 of the filter assembly 18 rests sealingly against the annular area 26 provided on the underside 27 of the cover 28. A beverage can then be brewed, the hot steam produced as the brewing water exits from the discharge port 47 being prevented from escaping to atmosphere. For example, when it is desired at the end of the brewing cycle to remove the paper filter with its contents (not shown) from the filter assembly 18, this requires swinging open of the filter assembly 18 away from the housing 2. Considering that both the first plane 23 and the second plane 30 are inclined relative to the plane of movement 24 by the angle of inclination a, the vertical distance d between a point D assumed on the annular area 26 and the points following a vertically opposite point C on the upper rim 22 will progressively increase, the upper rim 22 consequently moving away from the annular area 26, whereas, with the filter assembly 18 in the shut position, the upper rim 22 is in sealing engagement with the annular area 26 of the cover 28. Thus, as soon as the filter assembly 18 is in the process of being swung open, the upper rim 22 will also move vertically away from the annular area 26, thereby disengaging itself from the annular area 26, enabling the filter assembly 18 to swing open with particular ease.

On returning the filter assembly 18 into the cavity 36 by swinging it about the pivot axis 32, the upper rim 22 of the filter assembly 18 will abut the annular area 26 of the cover 28. Up to this position, the filter assembly 18 must not strike against the wall formed by the cavity 36 (FIGS. 7 and 8). As the closing movement proceeds, the locking device 42 will engage within the first slot 43, the ramp 66 abutting in the process against the upper edge 62 of the slot 43 and, with the filter assembly 18 continuing its inward movement, lifting it a small amount in the direction X until the upper edge 62 falls into the notch 61. The locking device 42 being formed by a resilient tongue, the filter assembly 18 has its upper rim 22 invariably slightly biased against the annular area 26 in the direction X. At the same time, this locking engagement maintains the filter assembly 18 fixedly located in the shut position. When it is desired to open the filter assembly 18, an outward radial force is required to act on the gripping area 53 in the direction W, enabling the filter assembly 18 to be disengaged from the locking device 42 so it can be swung open about its pivot axis 32.

According to the embodiment of FIG. 10, the filter assembly 18 rests on a horizontally extending sliding guide 50, so that a pull exerted on the filter assembly 18 in the direction Z by means of the carrying handle 51 produces a horizontal displacement of the filter assembly, with the first plane 23 which is formed by the upper rim 22 then moving away from the second plane 30 which is formed by the underside 27 of the cover 28. In this embodiment, too, the filter assembly 18 is no longer in contact with the cover 28 in any one of its open positions as shown, by way of example, by the broken line. As the filter assembly 18 is inserted, a depression 65 formed on the tongue 64 resiliently engages an elevation 63 which is part of a locking device 42 attached to the housing 2, such that the filter assembly 18 will be invariably pulled towards the housing 2 in the direction of displacement Z at a low force, thus ensuring that the upper rim 22 is maintained in abutment with the annular area 26 of the cover 28. This thus effects equally a durable seal in this area.

I claim:

1. A beverage brewing apparatus comprising
   a brewer housing including a cover assembly;
   a filter assembly which is removable from the brewer housing along a plane of movement, said filter assembly having an upper rim which forms an opening on top, wherein the filter assembly is adapted to receive ingredients such as ground coffee beans or tea leaves for preparing a brew, wherein the opening of the filter assembly is located under the cover assembly when the filter assembly is fully inserted into the brewer housing, wherein the cover assembly has an underside in which there is a discharge port from which a brewing water flows through the opening into the filter assembly and thereafter into a vessel placed under the filter assembly, wherein a predominant portion of the upper rim of the filter assembly lies in a first plane, wherein an area of the underside of the cover assembly cooperates with the predominant portion of the upper rim and lies in a second plane, wherein, with the filter assembly fully inserted into the brewer housing, the first and the second planes are vertically disposed in close proximity to each other, extend essentially parallel to each other, and are inclined relative to the plane of movement by an angle of inclination (a).

2. The beverage brewing apparatus as claimed in claim 1, wherein the filter assembly is moved along the plane of movement by pivoting it about a pivot axis arranged in the housing and extending vertically to said plane of movement.

3. The beverage brewing apparatus as claimed in claim 2, wherein the angle of inclination (a) is between 1 and 15 degrees.

4. The beverage brewing apparatus as claimed in claim 3, wherein the filter assembly includes at least one slot and the housing includes at least one locking device which cooperates with the at least one slot when the filter assembly is fully inserted into the housing and thereby cause the upper rim of the filter assembly to be maintained in biased engagement with the underside of the cover assembly.

5. The beverage brewing apparatus of claim 2, wherein said angle of inclination (a) is about 4 degrees.

6. The beverage brewing apparatus as claimed in claim 1 or claim 2, wherein only part of the upper rim of the filter assembly lies in the first plane (23) and the remaining portion of the upper rim extends below the first plane, and wherein the underside of the cover assembly includes an elevation projecting from the second plane and engaging the remaining portion in a closing fashion when the filter assembly is fully inserted into the brewer housing.

7. The beverage brewing apparatus as claimed in claim 1, wherein the dimensions of the filter assembly and the housing are selected such that, during insertion of the filter assembly into the housing, contact is established between the upper rim of the filter assembly and the underside of the cover assembly before the filter assembly contacts another part of the housing.

8. The beverage brewing apparatus as claimed in claim 7, further comprising a ring seal made of an elastic material affixed to the upper rim of the filter assembly.

9. The beverage brewing apparatus of claim 7, further comprising a ring seal made of an elastic material affixed to the underside of the cover assembly in the area of abutting engagement of the upper rim of the filter assembly.

\* \* \* \* \*